Patented Nov. 19, 1935

2,021,277

UNITED STATES PATENT OFFICE 2,021,277

SEED DISINFECTANT

Fritz Wolff, Berlin-Pankow, Germany, assignor to Schering-Kahlbaum A. G., Berlin, Germany, a corporation of Germany No Drawing. Application June 20, 1934, Serial No. 731,461. In Germany December 21, 1931

11 Claims. (Cl. 167—38)

This invention relates to seed disinfectants, and more particularly to the use of mercurized phenols as seed disinfectants.

Water-soluble mercurized phenols, such as the sodium salt of the cyano mercuri cresol, have already been used for this purpose. They are excellent wet disinfectants. When used as dry disinfectant, these compounds, however, are very unsatisfactory, especially since they do not affect Helmintosporium gramineum of the barley.

The latter plant disease, on the other hand, can be very effectively overcome by using insoluble or only slightly soluble mercurized phenols, such as ortho hydroxy phenyl mercuri chloride or acetate, as dry seed disinfectants. Their application, however, requires concentrations of 10 to 15% of the fungicide. Furthermore, their slight solubility and penetrative power encroach unfavorably upon their effectiveness as dry seed disinfectants.

When using the latter compounds as wet seed disinfectants, they have to be dissolved in sodium hydroxide solution. The sodium hydroxide, however, diminishes considerably their fungicidal value.

Now, it has been found, that the inner anhydrides of the mercurized phenols of the general formula:

wherein X represents either hydrogen or any substituted or unsubstituted alkyl, aryl, aralkyl or alicyclic radical, or any other substituent, such as halogen, the nitro, hydroxy and the like groups, are excellent wet as well as dry disinfectants. They are capable of disinfecting infected seeds completely and in low concentrations of application.

These inner anhydrides of mercurized phenols are compounds which can be obtained very readily and quantitatively. For this purpose, phenols which have been mercurized by treatment with mercuri salts are dissolved in sodium hydroxide solution, whereupon the alkaline solution is treated with carbon dioxide, thereby precipitating the anhydrides.

Or the molten phenols are treated at a low temperature with mercuri oxide until the latter has been dissolved.

The inner anhydrides obtained in this manner are soluble in phenols without cleavage of the anhydride bond, in contrast to their solution in sodium hydroxide whereby the anhydride bond is changed and split open. The phenol acts as solvent, renders the inner anhydrides water-soluble and allows the application of these compounds as wet and as dry disinfectants.

The increase of the fungicidal value of the mercury contained in these inner anhydrides when compared with the known and hitherto used mercuri phenols having acid radicals combined with the mercury, is due to the specific manner of linkage of the mercury in the anhydrides and to the increase of their penetrative power by dissolving them in phenol. Furthermore, the dosis curativa calculated for mercury is decreased considerably by the use of these inner anhydrides, namely by about 30%, since the mercury concentration can be reduced from 2.5% to 1.5%.

Example 1

In order to produce a dry seed disinfectant with a mercury content of 1.5%, 2.2 grams of the anhydride of the hydroxy phenyl mercuri hydroxide are dissolved in 15 grams of phenol. Kaoline is impregnated with said solution so as to give 100 grams of a powdery dry seed disinfectant which is applied to the seed in concentrations of 2 to 3:1000.

Example 2

A wet seed disinfectant is obtained by dissolving 5 grams of the inner anhydride of the hydroxy tolyl mercuri hydroxide in 5 grams of phenol. Said solution is poured into 1 liter of water while stirring vigorously. The aqueous milky solution is applied to the seed in amounts of 3 liters for 100 kilograms of seed.

Instead of the mentioned inner anhydrides, also other compounds may be used, such as the inner anhydrides of mercurized xylenols, amylphenols, diphenols, phenyl phenols, cyclohexyl phenols, chlorophenols and their homologues, nitrophenols and their homologues, hydroquinone and other poly hydroxy benzenes, and the like.

Instead of using phenol or cresol as solvents, also other phenols or their mixtures are suitable, such as the higher phenol homologues, chlorophenols, diphenols and the like.

Example 3

A dry seed disinfectant with a mercury content of 2% is obtained by dissolving 3.2 grams of the anhydride of the mercurized 1.3.5-xylenol in 15 grams of 1.3.5-xylenol. Talcum is impregnated with said molten mixture so as to yield 100 grams of a finely divided dry seed disinfectant. The application concentration of this product is the same as with the product of Example 1.

The seed disinfectants obtained according to this invention may be applied in mixture with other fungicidal compounds. Other carriers than kaoline may be used and various other changes and variations may be made by those skilled in the art in accordance with the principles set forth herein and in the claims annexed hereto.

What I claim, is:

1. A seed disinfectant comprising an inner anhydride of a mercurized phenol of the general formula

wherein X represents either hydrogen or any substituted or unsubstituted alkyl, aryl, aralkyl, or alicyclic radical or any other substituent such as halogen, the nitro-, hydroxy-, and the like groups, and a phenol.

2. A seed disinfectant comprising an inner anhydride of a mercurized phenol of the general formula

wherein X represents either hydrogen or any substituted or unsubstituted alkyl, aryl, aralkyl, or alicyclic radical or any other substituent such as halogen, the nitro-, hydroxy-, and the like groups, and phenol.

3. A seed disinfectant comprising a solution of an inner anhydride of a mercurized phenol of the general formula

wherein X represents either hydrogen or any substituted or unsubstituted alkyl, aryl, aralkyl, or alicyclic radical or any other substituent such as halogen, the nitro-, hydroxy-, and the like groups, in a phenol.

4. A dry seed disinfectant consisting of an inner anhydride of a mercurized phenol of the general formula

wherein X represents either hydrogen or any substituted or unsubstituted alkyl, aryl, aralkyl, or alicyclic radical or any other substituent such as halogen, the nitro-, hydroxy-, and the like groups, a phenol, the former being dissolved in the latter, and a carrier impregnated with said solution.

5. A wet seed disinfectant consisting of an inner anhydride of a mercurized phenol of the general formula

wherein X represents either hydrogen or any substituted or unsubstituted alkyl, aryl, aralkyl, or alicyclic radical or any other substituent, such as halogen, the nitro-, hydroxy-, and the like groups, a phenol, the former being dissolved in the latter, and water mixed with said solution.

6. A seed disinfectant comprising the inner anhydride of the hydroxy phenyl mercuri hydroxide of the general formula

and a phenol, the former being dissolved in the latter.

7. A seed disinfectant comprising the inner anhydride of the mercurized 1.3.5-xylenol of the general formula

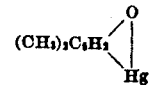

and a phenol, the former being dissolved in the latter.

8. A method of producing an effective seed disinfectant, comprising the step of dissolving an inner anhydride of a mercurized phenol of the general formula

wherein X represents either hydrogen or any substituted or unsubstituted alkyl, aryl, aralkyl, or alicyclic radical or any other substitutent, such as halogen, the nitro-, hydroxy-, and the like groups, in a phenol and combining the mixture obtained with the usual components of seed disinfectants.

9. A method of treating seeds and plants to eradicate diseases thereof which comprises providing a solution in a phenol of an inner anhydride of a mercurized phenol of the general formula

wherein X represents an organic or inorganic radical or hydrogen, and applying the same to said seeds or plants.

10. A method of treating seeds and plants to eradicate diseases thereof which comprises providing a mixture of an inert carrier and a solution in a phenol of an inner anhydride of a mercurized phenol of the general formula

wherein X represents an organic or inorganic radical or hydrogen, and applying the same to said seeds or plants.

11. A method of treating seeds and plants to eradicate diseases thereof which comprises providing a water solution containing a solution in a phenol of an inner anhydride of a mercurized phenol of the general formula

wherein X represents an organic or inorganic radical or hydrogen, and applying the same to said seeds or plants.

FRITZ WOLFF.